United States Patent Office 3,591,521
Patented July 6, 1971

3,591,521
METHOD OF STABILIZING AN ORGANIC SUBSTANCE WITH 5-AMINOURACIL AND 5-AMINOCYTOSINE AND THEIR DERIVATIVES
Taneo Nobukuni, Tokyo, Nobumitsu Yano, Saitama-ken, Masao Fukushima, Tokyo, Aiko Mizuno, Kanagawa-ken, and Fumio Nagayoshi and Toyoharu Takada, Tokyo, Japan, assignors to Asahi Kasei Kogyo Kabushiki Kaisha, Osaka, Japan
No Drawing. Filed Feb. 27, 1969, Ser. No. 803,054
Claims priority, application Japan, Mar. 5, 1968, 43/13,825; Apr. 27, 1968, 43/27,988
Int. Cl. C08f *45/60*
U.S. Cl. 252—403
15 Claims

ABSTRACT OF THE DISCLOSURE

Various organic substances are stabilized by adding 5-aminouracil, 5-aminocytosine, and/or their derivatives.

BACKGROUND OF THE INVENTION

In general, many organic substances, when exposed to air, are oxidized and thereby degraded. When exposed to air, the gasoline manufactured by the cracking of petroleum or the polymerization of gaseous hydrocarbons is oxidized to form a rubberlike material and a colored substance, and is thereby degraded. And foodstuffs, particularly fatty substances, such as butter, lard, etc., turn sour, and vitamins A, $B_2$ and K, when exposed to light, are oxidized and their nutritive values are lowered. These organic substances have usually been made resistant to oxidative degradation without damaging their useful properties by mixing therewith a small amount of a stabilizing agent. For this purpose, in general, phenol and amine compounds are used, although various stabilizing agents may be used.

SUMMARY OF THE INVENTION

The present invention relates to a method of stabilizing an organic substance by using 5-aminouracil, 5-aminocytosine, and/or their derivatives to prevent degradation by oxidation and/or light.

The 5-aminouracil derivatives (I) and 5-aminocytosine derivatives (II) used as stabilizing agents in the stabilization method of the present invention are compounds represented by the following formulae, respectively:

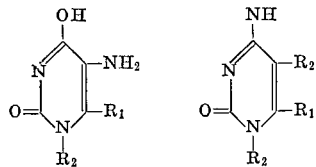

wherein $R_1$ is a hydrogen atom, a hydroxyl group, an amino group, or an alkyl group having 1 to 18 carbon atoms such as a methyl group, an ethyl group or a propyl group; and $R_2$ is a hydrogen atom, an alkyl group having 1 to 18 carbon atoms such as a methyl group, an ethyl group or a propyl group, or pentose or hexose such as glucose, xylose or ribose.

DETAILED DISCLOSURE OF THE PREFERRED EMBODIMENT

As the result of their research, the present inventors have found that 5-aminouracil, 5-aminocytosine and their derivatives which were so far not used for such purpose can be used as stabilizing agents for various organic compounds, such as, for example, gasoline, polyolefine, rubber, natural fat, and vitamins A, $B_2$, C and K, to prevent their degradation by oxidation and/or light.

To explain in more detail, polyolefines, polyethylene and polypropylene, when exposed to air, are degraded in that their insulating resistance is lowered, they become discolored and brittle, and they are gelated by oxidation decomposition in the molding stage at a high temperature. However, these defects can be prevented by adding 5-aminouracil, 5-aminocytosine or their derivatives thereto. Similar effects are obtained with polyhaloolefines such as polyvinylchloride and polyamides such as nylon. The 5-aminouracil, 5-aminocytosine and their derivatives are useful for preventing degradation of high impact polystyrene, including copolymers of butadiene and styrene, polyisoprene rubber, butyl rubber, nitrile rubber, neoprene rubber and natural rubber.

Furthermore, the compounds of the present invention are not only useful for stabilizing various types of lubricant, including fatty acid ester, polyalkylene oxide, silicone, phosphoric acid and silicic acid ester, and highly fluorated hydrocarbons, but also edible fats and oils such as, for example, linseed oil, liver oil, olive oil, peanut oil, soy bean oil, butter, and lard, and vitamins unstable for light and oxygen, such as vitamins A, $B_2$, C and K, etc.

The appropriate amount of 5-aminouracil, 5-aminocytosine or their derivatives required for use in the present invention is generally 0.0001 to 1%, by weight, based on the organic substance, although the amount may be varied depending upon the effectiveness of the compound to be used and the ease and extent to which the organic substance is deteriorated by oxidation. For example, in the distillate fuels such as gasoline, kerosine, and furnace oil, the appropriate amount is 0.001 to 0.01%, by weight; in the compositions exposed to more severe conditions, such as rubber, about 1%; and in substances such as foodstuffs in which, though the degradation by oxidation is mild, slight oxidation strikingly impairs the flavor thereby deteriorating the quality, 0.01 to 0.1%. The compounds to be added should be distributed throughout the organic substance as uniformly as possible; said compounds may be dissolved or dispersed in water or an appropriate organic solvent and can be added by means of spraying, mixing, or coating. The addition time is optional; it can be before or after processing or on the way, and the time required for addition may be varied according to the organic substance to which it is added.

The 5-aminouracil, 5-aminocytosine and their derivatives used in the present invention are white crystals or powder, stable to heat, light, acid, alkali, etc. and can be employed in combination with other anti-oxidants, preservatives, emulsifiers, plasticizers, dyes, pigments and other additives to stabilize organic substances, and also, in some circumstances, exhibit a synergistic effect. That is, the 5-aminouracil derivatives and 5-aminocytosine derivatives are recognized to have the mutual synergistic effect and to have the synergistic action with a stabilizing agent comprising known phenol, amine, or sulfite compounds. Therefore, in some cases, it is preferable to blend these materials appropriately in use.

The 5-aminouracil and its derivatives used in the present invention may be manufactured by means of the conventional method as described in T. B. Johnson, Uracil Synthesis, Journal of American Chemical Society 63, 263 (1941). That is, the 5-aminouracil or 5-amino-6-alkyluracil can be prepared by reacting urea with formyl acetate or β-ketoester to synthesize uracil or 6-alkyluracil followed by the nitration of the 5-position and the reduction thereof, and also the corresponding 5-aminouridine derivatives can be prepared by reacting these uracils with acetobromo-sugar according to the pyrimidine nucleotides synthesis process. And the 5-aminocytosine and its derivatives may be prepared by means of the conventional cytosine synthesis process as described in C. W. Whitehead, J.A.C.S. 74, 4267 (1952); 75, 671 (1953);

77, 5867 (1965). That is, cytosine derivatives are derived from urea, ethylcyanoacetate and ethylformate. And, 6-alkylcytosine is synthesized by deriving 6-alkyluracil by means of the process described in Kazinskaya, Journal of General Chemistry 27, 2113 (1950) followed by the conventional method. That is, when nitrating the 5-position followed by reduction, 5-aminocytosine or 5-amino-6-alkylcytosine is obtained. And also when reacting these cytosines with acetobromo-sugar according to the pyrimidine nucleotide synthesis method, the corresponding 5-aminocytidine derivatives can be prepared.

The present invention will be further illustrated with the following examples:

Example 1.—Stabilization of polypropylene 0.5% by weight of 5-aminouracil was added and mixed with polypropylene powder. After rolling in a two-roll mill at 180° C. for 5 minutes, the mixture was taken out as a sheet and was cooled. The mill-treated propylene sheet was cut into small pieces and pressed in a water press at 218° C. and 135 atm. for 7 minutes. The aging resistance of the 0.6 mm. thick sheet so obtained was tested in a forced air oven at 149° C.

The polypropylene containing with 5-aminouracil was resistant to degradation by oxidation for 250 hours. In contrast the control polypropylene was degraded after 3 hours.

Example 2.—Stabilization of polystyrene resin

An elastomer, such as, for example, polystyrene resin of high impact strength containing butadiene-styrene was made resistant to loss of elongation by compounding 0.5% by weight of 5-amino-6-methyl uracil. That is, the resin was dissolved in chloroform and 5-amino-6-methyluracil was added thereto. The mixture was spread on a glass plate and the solvent was evaporated to obtain a film.

The film was dried, cut, and pressed at a temperature of 160° C. under 135 atm. for 7 minutes to make a sheet 0.6 mm. thick.

A small piece of the sheet (approximately 10 x 1.25 cm.) was cut out. Next, the elongation of a part of the pieces were measured by an Instron Universal Tension Tester, and the elongation of the remaining pieces, after aging in a forced air oven at 75° C. for 6 weeks, was measured.

As the result, the resin to which 5-amino-6-methyl-uracil had been added kept 80% of the original elongation property while the control resin kept only 15% of the original elongation property.

Example 3.—Stabilization for rubber gelation 1.5% of 5-aminouracil was added to crude rubber not containing a gelation inhibitor, which was obtained by acid-treating a strip latex of SBR, and heat-aged in a forced air oven at 100° C. for 4 days.

The viscosity of the crude rubber to which 5-aminouracil had been added increased slightly to give an SBR having excellent gelation stability while the control crude rubber was remarkable in the rise of viscosity.

| 5-aminouracil | Mooney viscosity | |
|---|---|---|
| | Before aging | After aging |
| Not added | 4.0 | 66 |
| Added | 4.0 | 4.8 |

Example 4.—Stabilization of gasoline

A commercially available gasoline comprising substantially 10% of butane, 30% straight chain gasoline, 20% thermal cracked gasoline, 20% pentene and the residue which is a mixture of catalytically hydrocracked gasolines was thoroughly washed to remove natural and added inhibitors. The gasoline 1 g. added with 0.1% by weight of 5-amino-6-isobutyluracil was placed in a Warburg type flask filled up with oxygen under the atmospheric pressure, and the flask was sealed and connected to a Warburg manometer which is used for measuring the pressure change when the oxygen is absorbed by the sample in the flask.

From the pressure drop in the flask after 100 minutes under these conditions, the amount of oxygen absorbed was 153 $\mu$l. In contrast the amount of oxygen absorbed was 725 $\mu$l.

Example 5.—Prevention of lard acidification 0.02% of 5-amino-6-butyluracil was added to 20 g. of commercially available lard, and was weighed in a test tube, and the washed air was passed therethrough at the rate of 2.33 ml. per minute. Then the test tube was immersed in an oil bath at 98.7° C. It took 54.5 hours until the peroxide value of this treated sample reached 30; in contrast, the control required only 11.0 hours.

Example 6.—Stabilization of vitamin $B_2$ 300 mg. of L-methionin, 50$\gamma$ of vitamin $B_{12}$, 5 mg. of vitamin $B_2$ and 10 mg. of 5,6-diaminouracil were added to 10 ml. of water and sealed in a brown ampule; after the ampule had stood at room temperature for 10 days, the quantity of vitamin $B_2$ was analysed by the ribflavine fluorescence method. It was found that only 4.2% of the vitamin $B_2$ had decomposed, a demonstration of remarkable stabilization in comparison with the control in which 18.5% had decomposed.

Example 7.—Stabilization of vitamin C 1.01 g. of sodium L-ascorbic acid (902 mg. as vitamin C) and 100 mg. of 5,6-diaminouridine were added and mixed to 10 l. of commercially available cow's milk instant sterilized at 113° C. for 3 seconds (vitamin C content 98 mg.), and, after allowing it to stand in a refrigerator for 7 days, the specimen was quantitatively analyzed for vitamin C. The decomposition of vitamin C was found to be only 3.6% while for the control it was 18.5%.

Example 8.—Stabilization of polypropylene 0.5% by weight of 5-aminocytosine was added to polypropylene powder and mixed completely. The mixture was rolled in a two-roll mill at 180° C. for 5 minutes and the sheet was taken out from the mill and cooled. The mill-treated propylene sheet was cut into small pieces and pressed in a water press at 218° C., under 135 atm. for 7 minutes. The 0.6 mm. in. thick sheet, so obtained, was tested for aging resistance in a forced air oven at 149° C. The polypropylene with stabilizer was resistant to degradation by oxidation for 280 hours while the control was degraded after only 3 hours.

Example 9.—Stabilization of elastomer containing resin

A high impact strength polystyrene resin containing elastomer, for example, butadiene, was blended with 0.5% by weight of 5-amino-6-hydroxycytosine and was tested for loss of elongation. That is, the resin was dissolved in chloroform and subsequently 5-amino-6-hydroxycytosine was added thereto. The mixture was spread on a glass plate and the solvent was evaporated to give a film. The film was dried, cut, and pressed at a temperature of 160° C., under the pressure of 135 atm. for 7 minutes to make a sheet 0.6 mm. thick. A small piece, 10 x 1.25 cm. was cut from the sheet, and a part of this piece was measured for elongation in an Instron Universal Tension tester. The remainder of the piece was aged in a forced air oven at 75° C. for 6 hours and then its elongation was measured.

The resin with 5-amino-6-hydroxycytosine kept 78% of the original elongation property while the untreated resin kept only 13%.

Example 10.—Stabilization of rubber gelation 1.5% of 5,6-diaminocytosine was added to crude rubber not containing a gelation inhibitor, which was obtained by acid-treating a strip of SBR later, and heat aged in a forced air oven at 100° C. for 4 days.

There was only a slight rise in the viscosity of the crude rubber with 5,6-diaminocytosine to give an SBR having excellent gelation stability while in the control crude rubber there was remarkable increase in viscosity.

| 5,6-diaminocytosine | Mooney viscosity | |
|---|---|---|
| | Before aging | After aging |
| Not added | 40 | 67 |
| Added | 40 | 44 |

Example 11.—Stabilization of mineral oil

A purified water-like while mineral oil (Esso-Brimile D.U.S.P. grade) was stabilized under the following test conditions:

10 g. of sample mineral oil was placed in a Sly type flask filled up with oxygen at 25° C. under atmospheric pressure.

Thereafter, the flask was sealed and connected to a mercury manometer for measuring the pressure change when oxygen is absorbed by the sample in the flask. Next, the sample was heated until the manometer indicated that the pressure in the flask had dropped to 300 mg. Hg in comparison with the maximum pressure obtained at 150° C. In this case, the mineral oil with 0.1% by weight of 5-amino-6-isobutylcytosine was not degraded until after 150 hours whereas the control was degraded after 20 hours.

Example 12.—Prevention of beef tallow acidification 0.02% of 5-aminocytidine was added to 20 g. of commercially available beef tallow, and was weighed in a test tube, and washed air was passed therethrough at the rate of 2.33 ml. per minute. Then the test tube was immersed in an oil bath at 98.7° C. It took 56 hours until the peroxide value reached 30; in contrast the control required only 10.5 hours.

Example 13.—Stabilization of vitamin C 550 g. of red sour pitted cherry and 350 g. of cherry juice syrup were put in an enamel-lined Sanitary No. 2 can, and, thereafter, 1 g. of L-ascorbic acid and 0.1 g. of 5-amino-6-hydroxycytidine were added thereto. After degassing in a water bath for 8 minutes, the can was sealed by means of a double winding sealing machine. The can was placed in an autoclave and, after passing steam until the temperature of the water rose to 90° C., was allowed to stand for 12 minutes, and then the can was removed and cooled by scattering water. After standing in a refrigerator for 3 weeks, the can was opened and the quality of the red sour pitted cherries were evaluated according to the specification of the United States Standard for Grades of canned red sour pitted cherries. The sample with the stabilizer was excellent in appearance, color, feeling, and flavor in comparison with the control.

Example 14

4 mg. of each of the following compounds was added to 20 g. of commercially available beef tallow and placed in a test tube and washed air was passed therethrough. The test tube was placed in an oil bath at 987° C., and when the peroxide value reached 30, the following results were obtained, showing excellent stabilization in comparison with that of the control (10.5 hours):

| Stabilizer: | Hours until the peroxide value reached 30 |
|---|---|
| 5-aminouridine | 62 |
| 5-aminocytidine | 56 |
| 1-methyl-5-aminouracil | 52.5 |
| 1-methyl-5-aminocytosine | 58 |
| Control | 10.5 |

What is claimed is:
1. A method of stabilizing an organic substance against degradation by oxidation and light characterized by adding 0.0001 to 1% by weight of a compound selected from the group consisting of 5-aminouracil and its derivatives having the following formula:

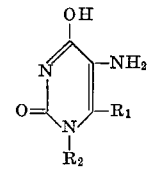

wherein $R_1$ is a hydrogen atom, a hydroxy, an amino, or an alkyl radical of 1 to 18 carbon atoms and $R_2$ is a hydrogen, an alkyl radical of 1 to 18 carbon atoms, or a pentose or hexose, and 5-aminocytosine and its derivatives having the following formula:

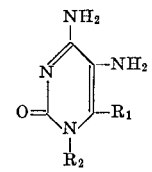

wherein $R_1$ and $R_2$ are the same as above.

2. A method as set forth in claim 1 characterized by adding a 5-amino-6-alkyluracil.
3. A method as set forth in claim 1 characterized by adding 5,6-diaminouracil.
4. A method as set forth in claim 1 characterized by adding 5-amino-6-hydroxyuracil.
5. A method as set forth in claim 1 characterized by adding 5-aminouridine.
6. A method as set forth in claim 1 characterized by adding a 5-amino-6-alkyluridine.
7. A method as set forth in claim 1 characterized by adding 5,6-diaminouridine.
8. A method as set for in claim 1 characterized by adding 5-amino-6-hydroxyuridine.
9. A method as set forth in claim 1 characterized by adding a 5-amino-6-alkylcytosine.
10. A method as set forth in claim 1 characterized by adding 5,6-diaminocytosine.
11. A method as set forth in claim 1 characterized by adding 5-amino-6-hydroxycytosine.
12. A method as set forth in claim 1 characterized by adding 5-aminocytidine.
13. A method as set forth in claim 1 characterized by adding a 5-amino-6-alkylcytidine.
14. A method as set forth in claim 1 characterized by adding 5,6-diaminocytidine.
15. A method as set forth in claim 1 characterized by adding 5-amino-6-hydroxycytidine.

References Cited

UNITED STATES PATENTS

| 2,953,444 | 9/1960 | Thompson | 252—403 |
| 2,969,364 | 1/1961 | Lyttle | 260—256.4 |
| 3,442,898 | 5/1969 | Luethi | 252—403 |

RICHARD D. LOVERING, Primary Examiner

I. GLUCK, Assistant Examiner

U.S. Cl. X.R.

44—63; 99—163; 260—45.8, 45.9, 256.4, 398.5, 666.5